United States Patent
Buckman et al.

(10) Patent No.: US 10,318,661 B2
(45) Date of Patent: Jun. 11, 2019

(54) MANAGING CUSTOM REVIT INHERITANCE-BASED ASSEMBLY FAMILIES FOR MANUFACTURING

(71) Applicant: Applied Software Technology, Inc., Atlanta, GA (US)

(72) Inventors: Rick Buckman, Phoenix, AZ (US); Fausto Mendez, Phoenix, AZ (US)

(73) Assignee: Applied Software Technology, Inc., Atlanta, GA (US)

( * ) Notice: Subject to any disclaimer, the term of this patent is extended or adjusted under 35 U.S.C. 154(b) by 0 days.

(21) Appl. No.: 15/375,369

(22) Filed: Dec. 12, 2016

(65) Prior Publication Data

US 2018/0032649 A1 Feb. 1, 2018

Related U.S. Application Data

(60) Provisional application No. 62/367,473, filed on Jul. 27, 2016.

(51) Int. Cl.
*G06F 17/50* (2006.01)

(52) U.S. Cl.
CPC ...... *G06F 17/5004* (2013.01); *G06F 2217/12* (2013.01)

(58) Field of Classification Search
CPC ............... G06F 17/5004; G06F 2217/12
USPC .............................................. 703/1
See application file for complete search history.

(56) References Cited

U.S. PATENT DOCUMENTS

| | | | | |
|---|---|---|---|---|
| 6,810,401 B1* | 10/2004 | Thompson | .............. | G06F 17/50 |
| 7,103,434 B2* | 9/2006 | Chernyak | .............. | G06F 17/50 700/103 |
| 7,546,571 B2* | 6/2009 | Mankin | .............. | G06F 17/5045 700/103 |
| 2005/0071135 A1* | 3/2005 | Vredenburgh | ...... | G06F 17/5004 703/1 |
| 2005/0203718 A1* | 9/2005 | Carek | ...................... | G06N 5/02 703/1 |
| 2008/0015823 A1* | 1/2008 | Arnold | ...................... | G06F 8/20 703/1 |
| 2014/0200863 A1* | 7/2014 | Kamat | .................. | G01C 15/00 703/1 |

* cited by examiner

*Primary Examiner* — Juan C Ochoa
(74) *Attorney, Agent, or Firm* — Clayton, McKay & Bailey, PC

(57) ABSTRACT

Systems and methods presented herein provide a plugin to REVIT or a similar program that allows for utilizing nested families for related parts and assemblies. Assembly families can include an inheritance tree where an instance of a host family implements child and sub-child families. The child and sub-child families can inherit parameters from the host family. To manage parameter values associated with the nested structure, the plugin can provide a custom dialog that acts as a middle layer between the user and the parameter settings of the computer-aided design program. The custom dialog can associate user selections with permissible values for parameters related to the host family.

19 Claims, 9 Drawing Sheets

FIG. 4

MANAGING CUSTOM REVIT INHERITANCE-BASED ASSEMBLY FAMILIES FOR MANUFACTURING

CROSS REFERENCE TO RELATED APPLICATION

This application claims priority to provisional patent application No. 62/367,473 ("A System for Managing Custom Revit Content for Manufacturing and Fabrication"), filed Jul. 27, 2016, which is incorporated by reference in its entirety.

BACKGROUND

AUTODESK REVIT is Building Information Modeling ("BIM") software that allows users to elaborately design three-dimensional structures. REVIT can be used to design complex buildings all the way down to components and assemblies for use in a project. For example, a user can model an entire plumbing or electrical installation within a building. Related components, such as electrical boxes and fittings, can be grouped together to allow a user to more easily find the right parts and use them in the project.

A component in REVIT can actually be an assembly of several parts, saving the user time in generating the REVIT model. The multiple parts can each be designed into the single assembly, with parameters that impact each of the parts. A REVIT user can design a set of similar assemblies by changing the parameters. For example, an electrical junction box could have different numbers of outlets, different shaped outlets, different outlet locations, different protective covers, and different connective pieces.

Because of the sheer number of combinations that can make up assemblies in a REVIT family, groups of assemblies can be unwieldy. First, REVIT can display a vast number of parameters, many of which are not even valid selections for a particular component or assembly. The user cannot easily determine what the parameters are, and how the selections will impact a particular assembly.

As a result, using REVIT for fabrication-level design is particularly difficult. Because fabricated parts and assemblies can be very detailed, more parameters and values are often required. Because there is no easy way to track all these parameters, documenting the fabrication is particularly difficult. In short, REVIT does not currently integrate fabrication-level content into its workflow.

Therefore, a need exists for a system component that can help a user decipher the relevant parameters in a REVIT family for fabrication-level content.

SUMMARY

The examples described herein specifically address technical problems and limitations of REVIT and similar BIM software. The examples include a plugin that operates with a nested family of assemblies within REVIT. The nested families reduce storage space for large families of related assemblies. However, nested families create additional complexity for parameters and parameter values. When many nested families exist within a host family, it becomes very difficult to track or understand what parameters and values impact a particular part or assembly.

To help solve this problem, the plugin can provide a custom dialog display that acts as an intermediate layer between the user and the many REVIT parameters. By using the custom dialog display, the user can select between options for features that are linked to REVIT parameters within the nested families. The dialog display can prevent the user from selecting values for REVIT parameters that will not work with the particular assembly. This is particularly useful in the context of nested families, where inherited parameters are difficult to trace and set by the user.

In one example, the nested family includes a host family that serves as a root node for a plurality of children. The child families can inherit parameters defined in the host family. The host family can include all the parameters needed for the assembly, the child families can define possible value combinations for parts within those assemblies. Therefore, the inherited parameters can have corresponding REVIT values based on a plurality of selectable options. In one example, these options can be selected in a custom dialog display that populates based on the host and the inherited parameters of the nested family.

The host family can be a file that manages conversion parameters in the dialog display. An instance of the host family can be its own file in an example. The instance can include references to children or sub-children that define which parameters are used in the assembly represented by the host instance. A child family can have multiple sub-children. In this way, different assembly combinations can be defined in a modular fashion that saves storage space.

However, a nested family can make it very difficult for a user to understand what parameters actually apply to a sub-child, since only some features are inherited and only a subset of parameter values may work within the sub-child.

To solve this problem, the plugin can store and sort parameters in a filtered list that is used to populate selection options in a dialog display. The dialog display can be an additional window or pane that the user is able to open within REVIT. The dialog display can include the different features (i.e., options) and value selections that are defined by the child or sub-child family instances. These features and value selections are tied to the underlying REVIT parameters and parameter values. The dialog display is able to display a compound list of properties that apply to the selected assembly. By providing the dialog display as an intermediate layer, the plugin eliminates the need for the user to understand which REVIT parameters and values can be used for a particular assembly.

The host file (i.e., instance) can manage some or all of the conversion factors for translating the selected options into stored parameter values. The host instance can control the children or sub-children in an example. The dialog display can control the host family instance, which acts as a parameter controller. In this way, the host instance can generate the graphical user interface of the dialog display based on how methods are implemented in the child and sub-child families. In this way, the child and sub-child families can determine how a parameter is set in the host.

A host file can be an assembly. A child family can be a combination of parts, and a sub-child family can be a single part. In this way, an assembly, represented by an instance of a host family, can be a collection of part combinations.

The plugin can enable a user to specify fabrication-level data during the family insertion (model building) process. This can facilitating auto-generated fabrication documentation as well as material takeoff and potentially labor takeoff as well. The result is a greatly simplified data flow within REVIT for fabrication-level assemblies. This can allow REVIT to more fully reach its BIM potential.

Although REVIT is referred to throughout this disclosure, the examples apply to any computer-aided design ("CAD") program.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings:

FIG. 4 is an exemplary dialog display;

DESCRIPTION OF THE EXAMPLES

Reference will now be made in detail to the present exemplary examples, including examples illustrated in the accompanying drawings. Wherever possible, the same reference numbers will be used throughout the drawings to refer to the same or like parts. The described examples are non-limiting.

Exemplary systems herein implement a nested family structure to define assemblies of parts in REVIT. The nested family structure allows for creating more assemblies while using less storage space and processing power on a computing device. The plugin can interact with REVIT to set values in the nested families and generate a bill of materials based on the nested parameters. Because the number of assemblies can grow exponentially, the plugin can track separate assembly identifiers and translate those into a plurality of REVIT identifiers. The nested assembly families can be stored in a file or database that is accessible by multiple users running REVIT or another CAD program. REVIT can have its own local database for assemblies. A global database can include part definitions that are used locally by host instances in an example.

The plugin can track which parameters and values apply to an assembly. Based on a user selection, the plugin can cause REVIT to display a dialog display. The dialog display allows the user to set parameter values for an assembly in a visually understandable manner. In one example, the dialog display acts as a middle layer between the user and the REVIT, displaying assembly options for selection and mapping the selections to permissible parameter values in REVIT. This can eliminate the complexity involved in determining which parameters to set in a nested family structure. With inherited parameters, it is otherwise difficult for a user to know which parameters work together or are utilized by a particular part in the assembly since the parameters all exist in the host family.

In one example, the plugin can operate with REVIT through communicating with an application program interface ("API"). The dialog display can execute as a plugin to REVIT or another BIM or CAD system. It can also be a separate application that interfaces with REVIT through an API.

Figure 1:
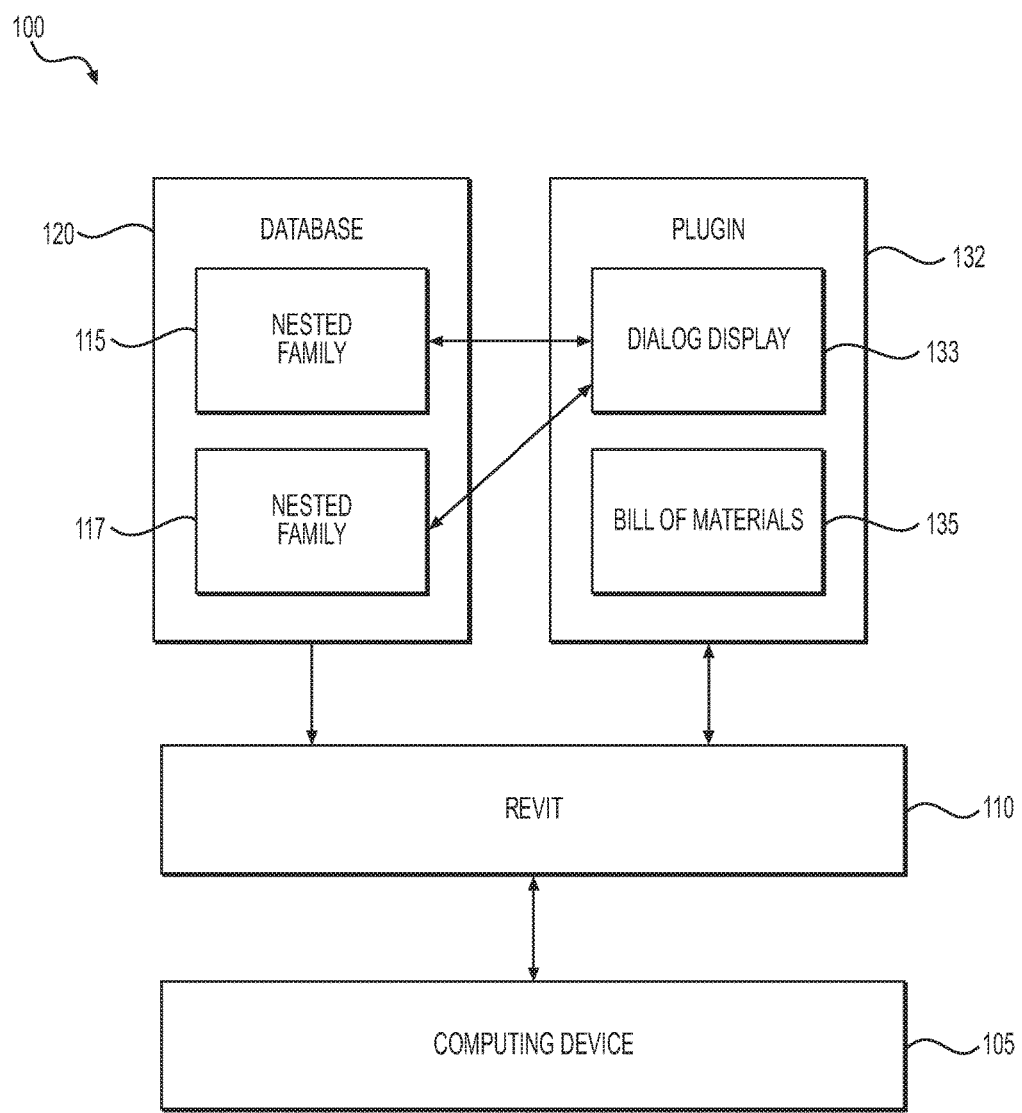
FIG. 1 is an exemplary illustration of system components for integrating nested assembly families with REVIT.

FIG. 1 includes an exemplary diagram of a system 100 in accordance with an example. REVIT 110 can execute on a computing device 105. Using REVIT 100, designers can create models of nearly any type of physical object, including dwellings and other structures. Although REVIT 110 is used as an example below, the disclosure applies to other CAD programs as well.

The computing device 105 can be any processor-based device, such as a personal computer, laptop, tablet, or cell phone. It can also include or be part of a server in one example. The computing device 105 can execute REVIT 110 by executing a set of instructions stored locally or remotely on a computer-readable medium. The computing device 105 can also execute the plugin 132 in one example. In another example, the plugin 132 can be an application that executes remotely on a server that is accessed by the computing device.

An example system includes a mechanism for efficiently setting parameter values in nested families 115 and 117 with a custom graphical user interface ("GUI"). This allows a user to more easily alter fabrication-level assemblies in BIM and CAD programs including REVIT 110. In one example, a database 120 stores nested families 115 and 117. The nested families 115 and 117 utilize inheritance to save space and ensure consistency in parameters across a family of related assemblies. A nested family 115 can include numerous defined families. As will be explained with FIG. 2, a root family, called a host family, can include all the parameters for the nested family 115. A plurality of child families can inherit a subset of those parameters from the host family and define a set of permissible values for the parameters. Sub-child families can in turn inherit an even smaller subset of parameters from one of the child families and further define permissible values. This can create a tree structure where the parameters for the entire family are defined initially in the host family, then inherited and implemented in the child families.

The database 120 can be implemented by any type of computing device. In one example, the database 120 is part of computing device 105. In another example, the database 120 is remotely accessible by the computing device 105, such as over a network. The network can be a local area network, an enterprise network, or the Internet. In one example, multiple computing devices 105 in an enterprise can remotely access the database 120 over a network. This can allow for centralized storage of the nested families 115 and 117, reducing storage for assemblies that can be loaded into a remotely executing REVIT application.

Using the API, REVIT 110 can execute custom methods for the plugin 132 when certain events occur within REVIT 110. REVIT 110 can execute on computing device 105 or another computing device, such as a server. Events are generated when an action is submitted to REVIT 110 for performance. The plugin 132 can implement the events to cause REVIT 110 to communicate with the plugin 132. The plugin 132 then can execute custom methods for customized functionality.

A dialog display 133 can be one example of customized functionality provided by the plugin 132. The dialog display 133 can be a window or pane that displays different options that a user can select for an assembly. The dialog display 133 can launch with a user clicks an assembly within a model in one example. In another example, one or more hotkeys can be set to launch the dialog display 133.

Based on the triggering event, a family load function in the plugin 132 can be executed. The family load function can load the family into the dialog display 133. For example, a complex electrical assembly with a power box and pipes can load from the host family. The family itself can have thousands of different combinations, based on combinations of permissible parameter values. In one example, the specific combination of an assembly can be represented in the dialog display 133 by highlighting or populating the selection options that make up the specific assembly.

As one example, the dialog display 133 can illustrate an electrical assembly, including a power box, a data box, conduit pipes, and ring connectors. Available options for selection by the user can include box width, power or data box location, ring diameter, ring depth, number of boxes, and other options. The plugin 132 can map these options back to permissible values for parameters in REVIT 110. Whereas the power box can be a sub-child family within a nested family 115, the parameters to be set can be in the host family (implemented by the sub-child family). In this way, the dialog display 133 can allow the user to select permissible values without having to know what those values or parameters are within REVIT 110. This can save a user much time and confusion when working with assemblies in REVIT 110.

In one example, the database 120 includes a rules engine for mapping options in the dialog display 133 to permissible values and parameters in the host family. The rules engine can identify a part type, a parameter, and permissible values. The permissible values can be based on both code regulations and supplier limitations for a specific part type. For example, local building codes might specify particular spacing or dimension limitations for a product. Within that range, the options can be further limited based on part sizes and other part characteristics offered by a supplier, in an example.

A dynamic-link library ("DLL") or database 120 can store graphics for displaying with the options in a dialog display 133. This can allow the user to visually reference the options they are selecting between. The options can be based on the sub-families that inherit the host parameters, and set the parameter values within the instance of the host family. The graphics can have an identifier and can be linked to a set of options for display in the dialog display 133.

In one example, the database 120 (e.g., rules engine) can store an assembly identifier for a particular family configuration (e.g., a particular combination of parameter values). The database 120 can be part of the DLL. For example, a table can link the assembly identifier to a sub-child family and to particular parameter values for use within that sub-child family. The sub-child family can be built based on parts that have identifiers within REVIT 110. But because the sub-child families can be more numerous than REVIT 110 identifiers allow (e.g., more than the number of unique identifiers available), the database 120 can track assembly identifiers separately.

The plugin 132 can also generate a bill of materials 135 that totals up all parts in a project based on assemblies defined by nested families 115 and 117. The bill of materials can populate by reading the values of the host family 205 (instance) that is part of the project.

Figure 2:
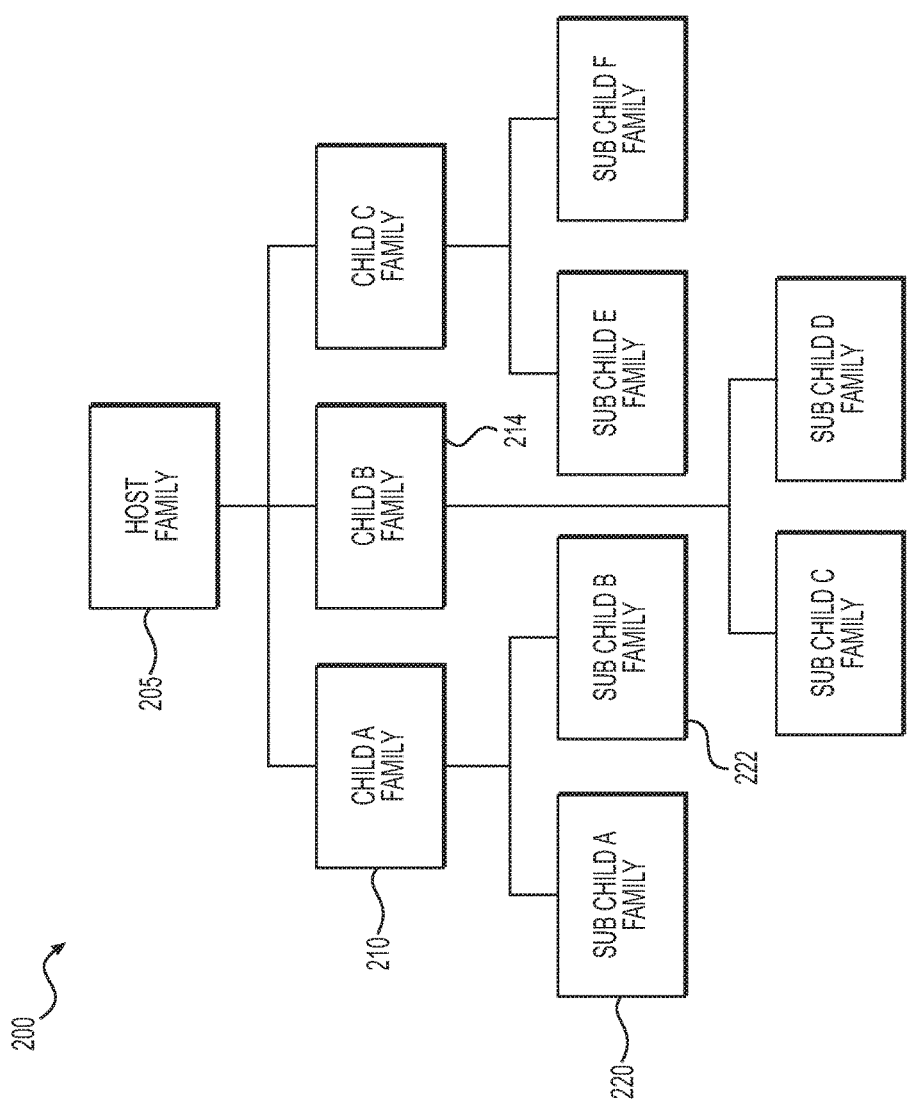
FIG. 2 is an exemplary diagram of nested families.

FIG. 2 shows an example illustration of a nested family 200 that can be used in an example. The nested family 200 includes a host family 205 that acts as the root of the nested family 200. The host family defines parameters that will be used within the family. These parameters can dictate sizes, materials, and numbers, locations, and shapes of parts that are used in an assembly. For example, an electrical assembly could include a junction box with different numbers of bays. The power box could have different depth, width, and height. The conduit can be sized or shaped differently, including length and diameter. Plastic ring connectors can have different sizes as well. These could all be different parameters that are stored and set within REVIT 110.

To define various assemblies that relate to the constructs and parameters in the host family 205, multiple child families 210 and 214 can be introduced. The child families 210 and 214 can inherit particular parameters from the host family 205. In one example, the host family 205 can represent an entire assembly. The parameters inherited can be limited to those that apply to the parts defined in the child family 210. For example, Child A Family 210 might inherit parameters related to a power box, whereas Child B Family 214 can inherit parameters related to a data box. In one example, the host family 205 can represent an entire assembly. Child families 210 and 214 can represent parts that are within the assembly. And Sub-child families 220 and 222 can represent portions of the part(s) in the Child family 210.

In one example, the different dialog displays 133 can load for the host family 205, a child family 210, or a sub-child family 220. This can allow the user to select more granular options by focusing on more granular aspects of the assembly. For example, if the entire assembly is selected, the dialog display 133 can load for the host family 205. If a power box is selected, the dialog display can load for Child Family A family 210. If the back of the power box is selected, the dialog display can load for Sub-child B family 222. Each of these families 205, 210, and 222 can have various combinations of options that are selectable by the user. These options are mapped by the plugin 132 back to permissible parameter values within REVIT 110.

Figure 3A:
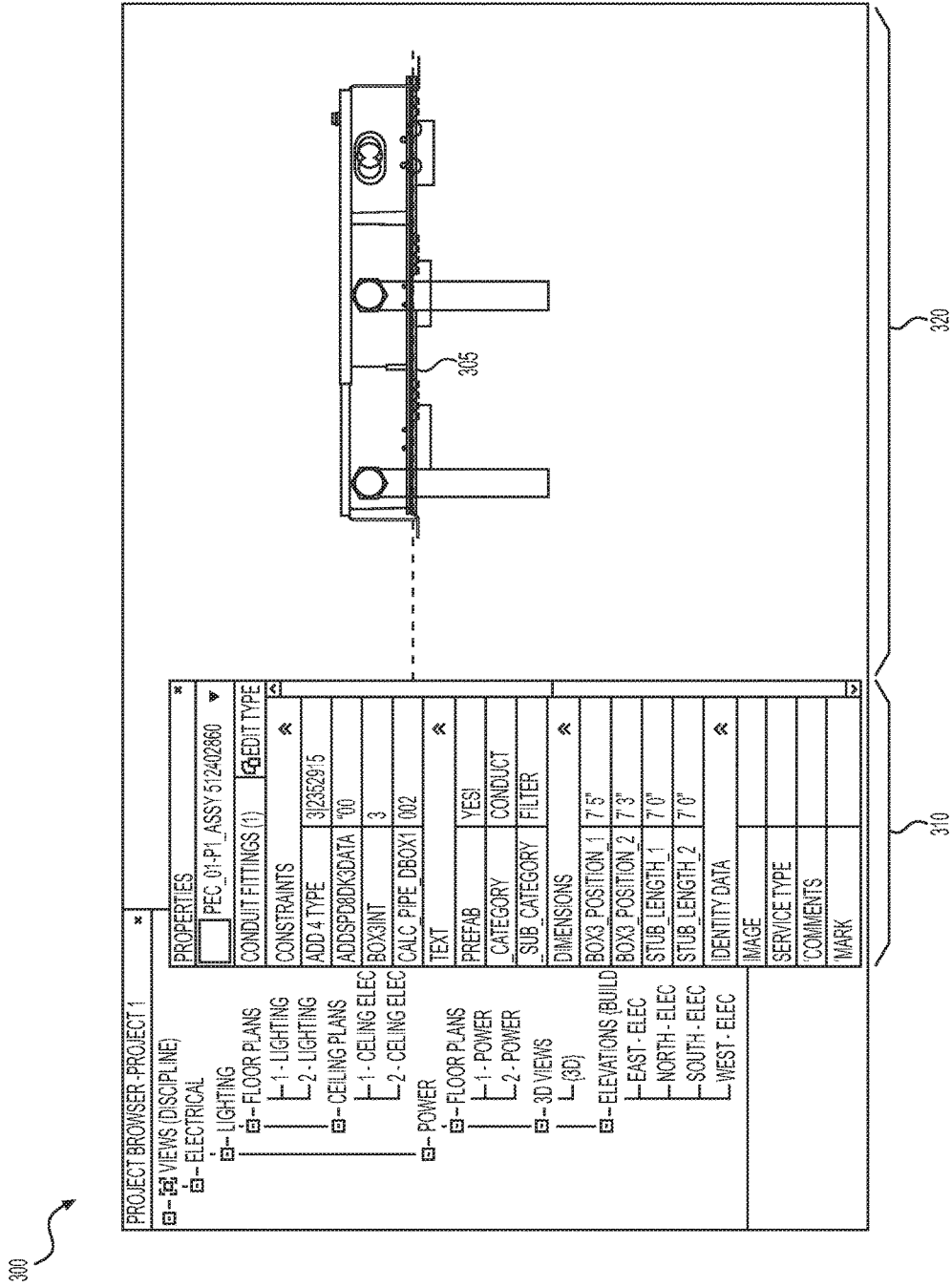
FIG. 3A illustrates an exemplary user interface.

FIG. 3A illustrates an example graphical user interface ("GUI") 300. The GUI 300 can be executed in REVIT 110 or another program. In this example, the GUI 300 includes a view of an assembly 320. The illustrated assembly 320 is an electrical assembly, but other types of assemblies are useable with the described examples. Examples can include plumbing, ductwork, and so on. Parameters 310 are separately presented. The values assigned to the parameters 310 can drive features of the assembly 320. However, the parameters 310 are so numerous that it is very difficult for a user to modify or customize the assembly 320 based on selecting new parameter values within the GUI 300.

The GUI 300 can be generated by an instance of a host family. The host family can be an abstract class with methods implemented by child and sub-child families. This can define the assembly that the instance of the host represents. The GUI 300 can be an abstract class that implements the children, which inherit from the host family 205 in that GUI 300.

In this way, the GUI 300 can be a graphical implementation of an inheritance model. The interface need not be modified. Instead, the host family 205 can implement an unlimited number of children without having to modify the host family 205. In turn, this means the code for GUI 300 need not be manually changed. The host family 205 instance can retrieve the values for use with the dialog display 133 based on the implemented child 210, 214 and sub-child families 220, 222. Different instances of the host family 205 can have different configurations. The different configurations can include different permissible values for an assembly. The permissible values can be assigned to the host parameters based on user selections in the GUI 300.

The instance of the host family 205 can track its own values. This can allow multiple assemblies that have their parameters set differently. Based on options or values selected by the user, the sub-children implemented by the host instance can change.

An assembly 305 can be a graphical representation based on an instance of a host family 205. Selecting the assembly 205 and utilizing a hotkey can cause a dialog display 133 to be generated so that the user can more easily adjust parameters of the nested instance.

Figure 3B:
FIG. 3B illustrates exemplary user interface.

As shown in FIG. 3B, the plugin 132 can display a dialog display 330 that isolates features of the assembly 320, and provides options that the user can select regarding those features. The options can be determined from the instance of the host family in an example. The permissible values that relate to the options can be determined from the child and sub-child families. The options that display in the dialog display 330 can be coded within the host family 205.

The host instance can track which values for each parameter are permissible. Once the user selects various options in the dialog display 330, the host instance can select the collection of children and sub-children that correspond to those permissible values. The children and sub-children can then drive the graphical display of the assembly 305 in FIG. 3A. For example, methods and parameters implemented by the children and sub-children can cause certain parts of the assembly to be visible or hidden, longer or shorter, and so on. The properties of the assembly can be extended by the children to manipulate the display of the assembly 305.

In this way, the system can ensure that users only select values that result in a constructible assembly. Selections within the dialog display 330 can be eliminated or added based on other user selections. Even a user without a deep level of technical know-how can build a detailed and constructible assembly. The GUI option combinations in the host instance can pick the appropriate children and sub-children that assign values to the parameters 310. The children and sub-children can determine what is displayed graphically, and can be used for counting components in a bill of materials.

Figure 4:
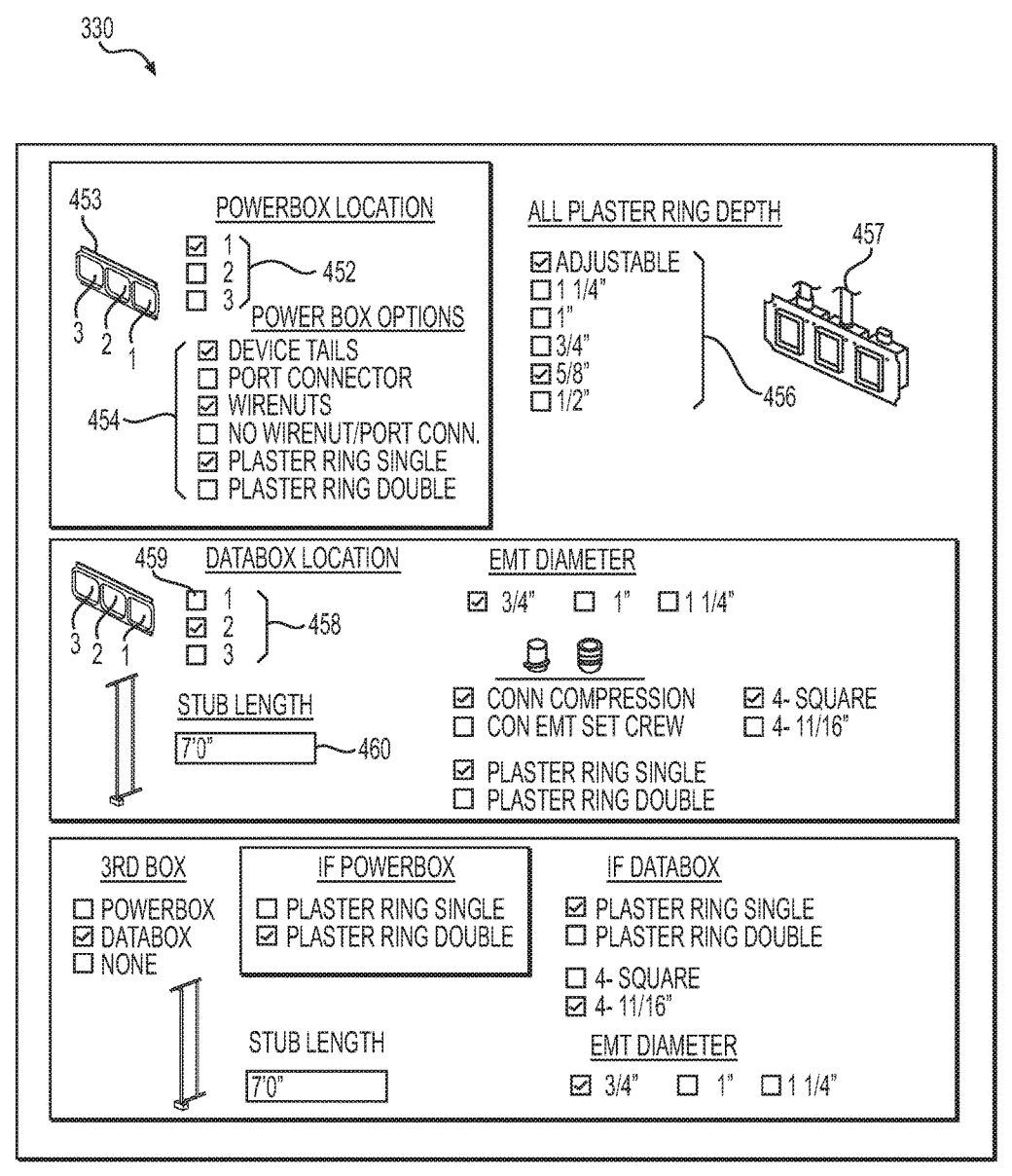

FIG. 4 illustrates an example dialog display 330 for the assembly 320. This dialog display 330 includes a set of options 453 for a power box location. In this specific example, a graphical representation 452 visually depicts the different power box locations that the user can choose between.

When the user makes a selection, the host instance can determine which other options remain selectable. The host instance of plugin 132 can disable options that would cause a conflict or are otherwise impermissible. For example, selection location 1 for the power box can cause the plugin 132 to disable option 1 within a second set of options 459 for the data box location.

Figure 8:
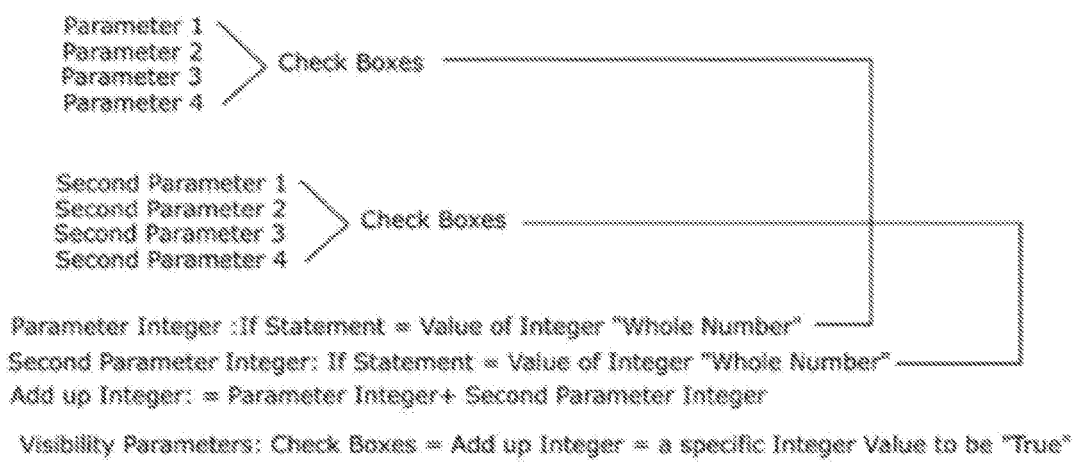
FIG. 8 is an exemplary illustration of an algorithm for parameter value calculation, in accordance with an embodiment.

In one example, some options include a numeric value that gets summed with other options. For example, a first set of options 454 can correspond to settings for a first parameter and a second set of options 456 can correspond to settings for a second parameter. The first options 454 can include values 1 through 6, and the second options 456 can include values 10 through 60 (counting by tens). If the third of the first options 454 and the fourth of the second options 456 are selected, the summed values can be 43 (e.g., 3+40=43). FIG. 8 further explains this methodology.

The plugin 132 can maintain a rules engine that maps specific integer values to parameter settings. The rules engine can be part of the host file (and differ between host files) in an example. The plugin 132 can compare the summed integer based on selected options to determine which permissible values to assign to corresponding REVIT 110 parameters. In the example above, the summed value of 43 can require a first parameter in REVIT 110 to be set to "true," and a second parameter to be set to "false." It is also possible for the combination of selections to be used in setting more REVIT parameters than the number of selections made. This approach can allow the user to choose between thousands of option combinations while ensuring that the correct permissible values are assigned to the relevant REVIT 110 parameters for the specific combination of options (i.e., the specific assembly). Although integers are used for summing in one example, other number types can also be used.

In another example, the dialog display 133 can also provide a text box 460 where the user can enter an option value. In the example of FIG. 4, the user can supply a stub length in text box 460. The plugin 132 can ensure that the user's entry is within minimum and maximum bounds (e.g., for length, width, or another value), and that it is formatted in a manner that the plugin 132 or REVIT 110 can utilize. If the user's entry does not meet this criteria, the plugin 132 can supply an error message for display in REVIT 110.

In one example, the plugin 132 stores the user selections and entries. Some or all of the selections can be summed and stored as a single number in one example. In addition or in the alternative, a list of selections and entries can be stored. The plugin 132 can store these values in database 120 in association with an assembly identifier that corresponds to the specific combination of selections and option values for the assembly. The database 120 entry can reference a family within the nested family 115, and can track which selections to apply to that family.

The plugin 132 can also translate the selections into permissible parameter values in REVIT 110. These permissible values can be stored in a REVIT 110 project in which the assembly is being used.

Figure 5:
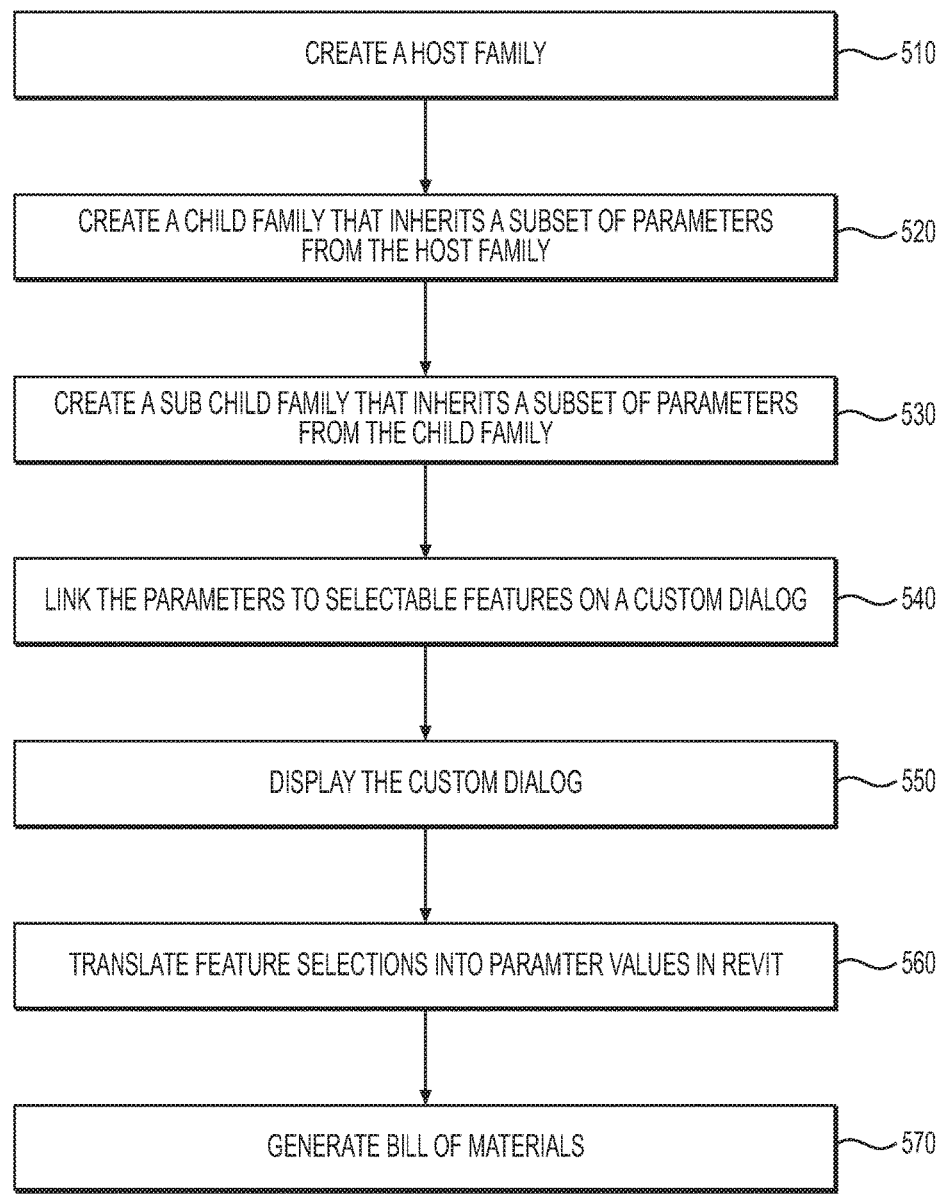
FIG. 5 is an exemplary flow chart.

Turning to FIG. 5, an example process for implementing nested families is shown. Stages 510-540 relate to setting up a nested family 115 for use within REVIT 110. Stages 550-570 relate to using the nested family 115 in REVIT 110.

At stage 510, an administrative user can create a host family 205. The host family 205 can include the parameters needed for the various parts and variants of an assembly, allowing for thousands of variations of the assembly. The host family 205 can include a collection of REVIT 105 parameters and options. Creating the host family 205 can also include identifying which options will be displayed for selection in the dialog display 133. In one example, a rules engine in the host family 205 tracks which options impact other options and parameters. The rules engine can alternatively be separate from the host family 205. The rules engine can allow the plugin 132 to know which options to enable or disable based on future user selections.

In another example, a family-specific rule set can be created and stored with the host family 205. The family-specific rule set can impose additional requirements beyond global rules of the rules engine. For example, if there are limitations on a particular type of assembly that do not broadly apply to other types of assemblies, those rules can be defined in the family-specific rule set.

At stage 520, a child family can be created. The child family 210 can inherit a subset of parameters from the host family 205. For example, if the child family 210 is designed to describe a data box, it can inherit the data box parameters from the host family 205. It can also define what values are available in an example. However, in this example, the host family 205 parameters related to plastic rings are not inherited.

Similarly, at stage 530, a sub-child family 220 can be created. The sub-child family 220 can inherit parameters from the child family 210. The sub-child family can be a sub-part of the part or sub-assembly that is described by the child family 210.

This inheritance tree can continue down any number of levels. However, the parameters used in a child family (e.g., child, sub, sub-sub, or further) can be defined for implementation at the host family 205 level.

The host family 205 need not be created before the child 210 or sub-child family 220 in some systems. For example, the nested family can be built by first creating sub-children 220, 222. Based on commonalties between the sub-children 220, 222, a child family 210 can be created to capture the commonalties. Further, based on commonalties between all child families 210, 214, a host family 205 can be created. The child and sub-child families can be the components of the host family 205 that determine what conversions and selection options are available in the dialog display 133.

At stage 540, an administrative user can identify which options will be displayed for selection in the dialog display 133 for the family 205, 210, or 220. These options can be limited, for example, based on code regulations or supplier options. For example, code might require particular spacing or sizes, and the options can be limited accordingly. Additionally, a supplier might only offer particular sizes of a component, and the options can be limited to match those sizes.

At stage 550, the plugin 132 can display the dialog display 133 (e.g., custom dialog). Stage 550 can execute when an implemented event occurs in one example. In another example, the user can set a hotkey to pull up the dialog display 133. In one example, the plugin 132 creates a new instance of a display object that causes the dialog display 133 to populate based on settings for the nested family 115 stored in the database 120.

In one example, the plugin 132 can implement a REVIT 110 process for displaying a dialog display 133. The plugin 132 can point REVIT 110 to the display object that corresponds to a particular nested family. The object can correspond to a particular family within the nested family 115, such as the host family 205, child family 210, or sub-child family 220. The object can dictate what is displayed within the dialog display 133, such as which selectable options 452, 454, and 456 and graphics 457. In one example, the object can also reference which rules should apply for translating user selections into permissible parameter values within REVIT 110.

The plugin 132 can pass the object back to REVIT 110, causing the dialog display 133 to be generated. The object can be a text delineated file, folder, or custom object that is invoked. In one example, the plugin 133 can provide a custom drop-down menu item can within REVIT 110 for displaying assembly features in a dialog display 133. For example, installation of the plugin 132 can include adding a custom menu item through methods in the REVIT 110 API.

In one example, the host file (which can be part of the DLL) can track which options to include in the dialog display 133. The instance of the host can also track which selections (e.g., values) apply for a specific assembly, so that some of the options are pre-selected when the dialog display 133 is generated. The host instance determines which children are part of the host based on the selections. The user can change some of these selections, which alters features of the assembly, and which children are associated with the host instance. The different features can be controlled by the child and sub-child families that apply to the selected values. The host instance can store the new selections for retrieval next time the user wants to generate a dialog display 133 for the assembly (which can be a different assembly with the new selections).

The DLL can also track graphical representations 453 and 457 that correspond to different sets of options 452 and 456 that relate to the assembly. The graphical representations can help the user visually comprehend the relevance or impact of the options on the dialog display 133.

The dialog display 133 can receive user selections of the options and translate those into permissible parameter values in REVIT 110 at stage 560. In one example, a translation process executes when an option is selected or changed. Alternatively, the translation can occur at some other event, such as when the user closes the dialog display. The translation process can be part of an executable file, such a DLL plugin, that runs within REVIT 110 on the user's computing device 105. In another example, the plugin 132 instantiates a new instance of a display object that executes a process for carrying out stages 550 and/or 560.

The plugin 132 can receive the user inputs and store them. The user inputs can be stored in REVIT 110. Alternatively, they can be stored in a special custom storage area in one example, such as in the database 120 in association with the nested family member to which the settings pertain.

Figure 6:
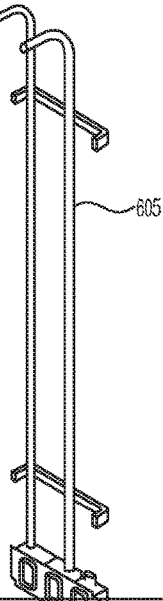
FIG. 6 is an exemplary illustration of a bill of materials.

FIG. 6 depicts an example illustration of a fabrication and takeoff bill of materials 600. This key feature can allow REVIT 110 to be used more productively for fabrication-level assemblies than ever before. The bill of materials 600 can be another custom dialog that is generated based on plugin 132. The plugin 132 can describe the parts and configurations (e.g., sizes) that are involved in an assembly based on the options selected previously by the user. Because the REVIT 110 parameters are not easily understandable, the bill of materials 600 can provide a superior mechanism for a user to understand which parts are required for an assembly or project. The plugin can populate the bill of materials 600 by extracting takeoff data from the model.

The bill of materials 600 can include a graphical representation of the assembly 605 in one example. It can also indicate the number of assemblies needed. A detailed list of materials can indicate the quantities for each item required to construct the assembly.

In one example, the bill of materials 600 is interactive. The user can click the image of the assembly or a specific part identified in the detailed list of materials and pull up the corresponding dialog display 133. In one example, the plugin 132 can populate the dialog display 133 utilize the rules engine to translate REVIT 110 parameter values into options and selections in the dialog display 133. In another example, the plugin 132 populates the dialog display based on the values stored in database 120 for an assembly identifier stored in the database 120 that is associated with the assembly 605.

The assembly 605 can be displayed in the bill of materials 600 based on functions and methods implemented in the host instance by child and sub-child families. For example, the children may cause certain details to be hidden and others to be revealed, while still presenting an accurate parts list in the bill of materials 600.

Figure 7:
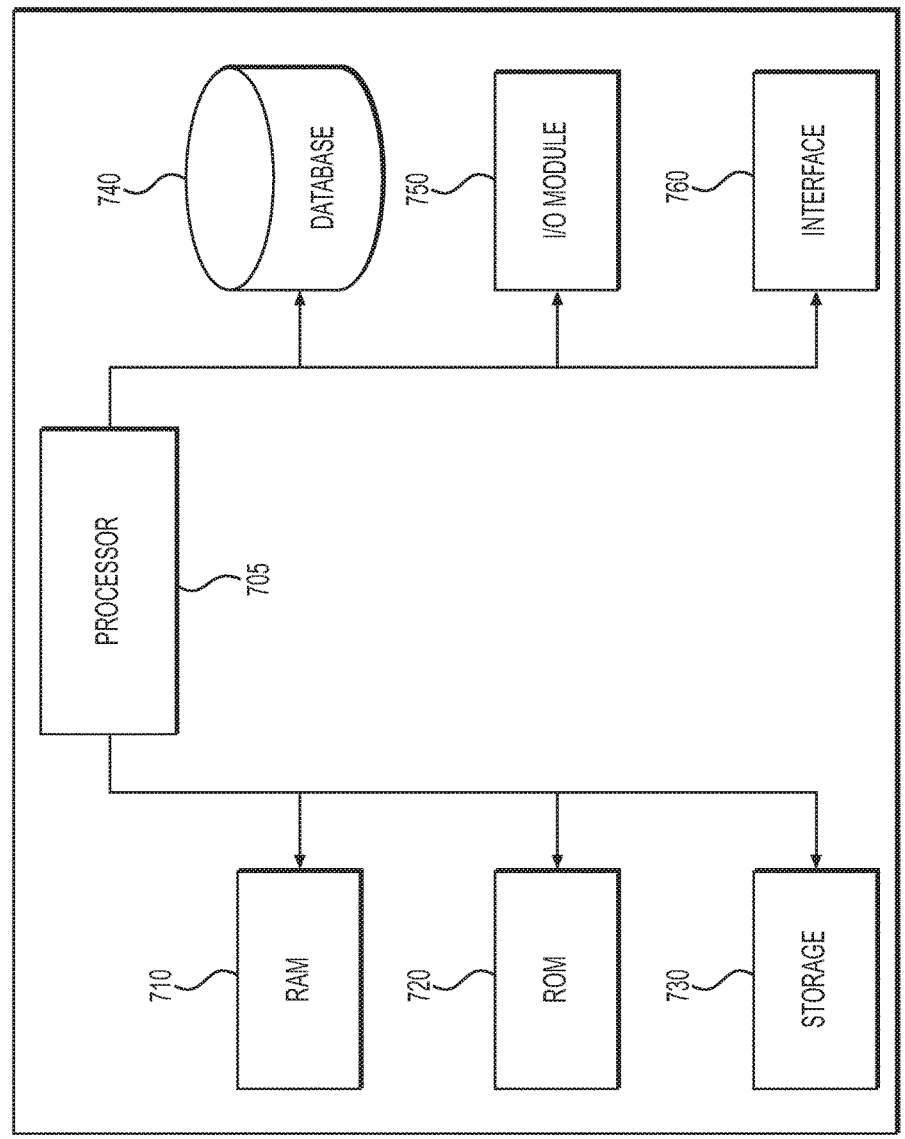
FIG. 7 is an exemplary illustration of system components, in accordance with an embodiment.

FIG. 7 depicts an exemplary processor-based computing system 700 representative of the type of computing device 105 of FIG. 1. Continuing with FIG. 7, the computing system 700 is exemplary only and does not exclude the possibility of another processor- or controller-based system being used in or with one of the aforementioned components. Additionally, a server or other computing device 105 need not include all the system hardware components in an embodiment.

In one aspect, system 700 may include one or more hardware and/or software components configured to execute software programs, such as software for storing, processing, and analyzing data. For example, system 700 may include one or more hardware components such as, for example, processor 705, a random access memory (RAM) module 310, a read-only memory (ROM) module 720, a storage system 730, a database 740, one or more input/output (I/O) modules 750, and an interface module 760. Alternatively and/or additionally, system 700 may include one or more software components such as, for example, a computer-readable medium including computer-executable instructions for performing methods consistent with certain disclosed embodiments. It is contemplated that one or more of the hardware components listed above may be implemented using software. For example, storage 730 may include a software partition associated with one or more other hardware components of system 700. System 700 may include additional, fewer, and/or different components than those listed above. It is understood that the components listed above are exemplary only and not intended to be limiting.

Processor 705 may include one or more processors, each configured to execute instructions and process data to perform one or more functions associated with system 700. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 7, processor 705 may be communicatively coupled to RAM 710, ROM 720, storage 730, database 740, I/O module 750, and interface module 760. Processor 705 may be configured to execute sequences of computer program instructions to perform various processes, which will be described in detail below. The computer program instructions may be loaded into RAM for execution by processor 705.

RAM 710 and ROM 720 may each include one or more devices for storing information associated with an operation of system 700 and/or processor 705. For example, ROM 720 may include a memory device configured to access and store information associated with system 700, including information for identifying, initializing, and monitoring the operation of one or more components and subsystems of system 700. RAM 710 may include a memory device for storing data associated with one or more operations of processor 705. For example, ROM 720 may load instructions into RAM 710 for execution by processor 705.

Storage 730 may include any type of storage device configured to store information that processor 705 may need to perform processes consistent with the disclosed embodiments.

Database 740 may include one or more software and/or hardware components that cooperate to store, organize, sort, filter, and/or arrange data used by system 700 and/or processor 705. For example, database 740 may include user-specific information, including password information, along with the custom objects and customization data. Alternatively, database 740 may store additional and/or different information. Database 740 may also contain a plurality of databases that are communicatively coupled to one another and/or processor 705, which may be one of a plurality of processors utilized by server 730.

I/O module 750 may include one or more components configured to communicate information with a user associated with system 700. For example, I/O module 750 may include a console with an integrated keyboard and mouse to allow a user to input parameters associated with system 700. I/O module 750 may also include a display including a graphical user interface (GUI) for outputting information on a monitor. I/O module 750 may also include peripheral devices such as, for example, a printer for printing information associated with system 700, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 760 may include one or more components configured to transmit and receive data via a communication network, such as the Internet, a local area network, a workstation peer-to-peer network, a direct link network, a wireless network, or any other suitable communication platform. For example, interface 760 may include one or more modulators, demodulators, multiplexers, demultiplexers, network communication devices, wireless devices, antennas, modems, and any other type of device configured to enable data communication via a communication network.

Other embodiments of the invention will be apparent to those skilled in the art from consideration of the specification and practice of the invention disclosed herein. It is understood that the examples can operate as an application or plugin with REVIT or any other BIM or CAD program. Also, the terms part, component, and assembly are used interchangeably. Similarly, the term host is used as a shorthand for host family. The term children can be used as a shorthand for child families and/or sub-child families. A family can be a class or a file. It is intended that the specification and examples be considered as exemplary only, with a true scope and spirit of the invention being indicated by the following claims.

What is claimed is:

1. A system for managing custom computer-aided design ("CAD") or building information modelling ("BIM") content, including:
   a non-transitory computer-readable medium that stores a nested collection of assembly families, including
   a host family having a first plurality of parameters;
   a child family that inherits a subset of the first plurality of parameters;
   first and second sub-child families that represent different part assemblies, the first sub-child family inheriting a different collection of parameters from the child family than the second sub-child family inherits from the child family; and
   a stored set of permissible values for the parameters inherited by the first and second sub-child families;
   a processor that executes a plugin to a computer-aided design program, the processor performing stages including:
   receiving a selection of an assembly defined by the host family;
   generating an instance of the host family;
   assigning a permissible value to a parameter that is defined in the instance of the host family by the first sub-child family;
   generating, on a graphical user interface, a custom dialog for the assembly based on the instance of the host family, wherein the custom dialog presents selection options for setting the first plurality of parameters with the set of permissible values, wherein the custom dialog prevents a user from selecting values for parameters that will not work with the assembly, and wherein the custom dialog provides different selection options and prevents selection of different parameter values for different assemblies;

receiving first and second selections within the selection options on the custom dialog;

adding a first value associated with the first selection to a second value associated with the second selection to arrive at a sum amount;

assigning a first permissible value of the first sub-child family to a first parameter of the first plurality of parameters based on the sum amount; and displaying the assembly.

2. The system of claim 1, wherein selecting one of the selection options causes the processor to retrieve a corresponding permissible value for the instance of the host family from the set of permissible values, wherein the instance of the host family implements first sub-child family based on the corresponding permissible value.

3. The system of claim 1, wherein the sum amount is used to retrieve permissible values from the set, wherein the set of permissible values is specified in a dynamic-link library ("DLL") file.

4. The system of claim 1, wherein the first selection option corresponds to the first parameter and the second selection option corresponds to a second parameter, wherein the processor performs further stages including determining a second permissible value to assign to the second parameter based on the sum amount.

5. The system of claim 1, wherein the processor performs additional stages including:
  assigning an identifier to the first sub-child family;
  storing the identifier in the non-transitory computer-readable medium in association with the first sub-child family; and
  linking the identifier to a plurality of part identifiers in the computer-aided design program, the plurality of parts being used in the assembly.

6. The system of claim 1, wherein the processor performs additional stages including:
  generating a bill of materials that includes the assembly, wherein the bill of materials reflects parameter settings made in the host family based on selections by a user.

7. The system of claim 6, wherein the processor performs additional stages including generating a custom dialog for the first sub-child family, wherein the custom dialog receives the user selections that are used in generating the bill of materials.

8. The system of claim 7, wherein the processor performs additional stages including generating a custom dialog for the assembly, wherein the custom dialog receives the user selections that are used in generating the bill of materials.

9. A method for managing custom computer-aided design ("CAD") or building information modelling ("BIM") content, the method comprising:
  creating a host family having a first plurality of parameters;
  creating a child family that inherits a subset of the first plurality of parameters;
  creating first and second sub-child families that each inherit a different collection of parameters from the child family;
  storing permissible values for the parameters inherited by the first and second sub-child families;
  generating an instance of the host family;
  generating, on a graphical user interface, a custom dialog for a part assembly based on the instance of the host family, the custom dialog including selection options for assigning a first permissible value of the stored permissible values to a first parameter in the host family that causes the host family to implement the first sub-child family, wherein the custom dialog prevents a user from selecting values for parameters that will not work with the assembly, and wherein the custom dialog provides different selection options and prevents selection of different parameter values for different assemblies;
  receiving first and second selections within the selection options on the custom dialog;
  adding a first value associated with the first selection to a second value associated with the second selection to arrive at a sum amount;
  determining a first permissible value of the first sub-child family to assign to a first parameter of the first plurality of parameters based on the sum amount; and
  displaying the assembly.

10. The method of claim 9, further comprising mapping, within the host family, the selection options in the custom dialog to different permissible values for the first parameter.

11. The method of claim 10, where the custom dialog includes a plurality of selection options, wherein the method further comprises:
  receiving first and second selections from the plurality of selection options, respectively;
  adding a first value associated with the first selection to a second value associated with the second selection to arrive at a sum amount; and
  determining the first permissible value to assign to the first parameter based on the sum amount.

12. The method of claim 11, wherein the first selection option corresponds to the first parameter and the second selection option corresponds to a second parameter, wherein the method further comprises determining a second permissible value to assign to the second parameter based on the sum amount.

13. A non-transitory computer-readable medium containing instructions for managing custom computer-aided design ("CAD") or building information modelling ("BIM") content, the instructions causing a processor to execute stages including:
  creating a host family having a first plurality of parameters;
  creating a child family that inherits a subset of the first plurality of parameters;
  creating first and second sub-child families that inherit different collections of parameters from the child family;
  storing permissible values for the parameters inherited by the first and second sub-child families;
  generating an instance of the host family to display, on a graphical user interface, a custom dialog for a part assembly, the custom dialog allowing a user to set the parameters inherited by the first and second sub-child families, the custom dialog limiting selection of parameter values to the stored permissible values, wherein the custom dialog prevents a user from selecting values for parameters that will not work with the assembly, and wherein the custom dialog provides different selection options and prevents selection of different parameter values for different assemblies;

receiving first and second selections within the selection options on the custom dialog;

adding a first value associated with the first selection to a second value associated with the second selection to arrive at a sum amount;

determining a first permissible value of the first sub-child family to assign to a first parameter of the first plurality of parameters based on the sum amount; and displaying the assembly.

14. The non-transitory computer-readable medium of claim 13, further comprising mapping a plurality of attribute selections in the custom dialog to different permissible values for one of the subset of the first plurality of parameters.

15. The non-transitory computer-readable medium of claim 13, where the custom dialog includes a plurality of selection options, wherein the stages further comprise:

receiving first and second selections from the plurality of selection options, respectively;

adding a first value associated with the first selection to a second value associated with the second selection to arrive at a sum amount; and determining a first permissible value to assign to a first parameter of the subset of the first plurality of parameters based on the sum amount.

16. The non-transitory computer-readable medium of claim 15, wherein the first selection option corresponds to the first parameter and the second selection option corresponds to a second parameter, wherein the stages further comprise determining a second permissible value to assign to the second parameter based on the sum amount.

17. The non-transitory computer-readable medium of claim 13, wherein the processor executes additional stages including:

generating a bill of materials that includes the part assembly, wherein the bill of materials reflects parameter settings made in the host family based on selections by a user.

18. The non-transitory computer-readable medium of claim 17, wherein the processor executes additional stages including generating a custom dialog for the first sub-child family, wherein the custom dialog receives the user selections that are used in generating the bill of materials.

19. The non-transitory computer-readable medium of claim 13, wherein the processor executes additional stages including:

displaying a graphical representation of the part assembly;

receiving selection of a first part of the part assembly and, in response, displaying a first parameter value from the first sub-child family; and receiving selection of a second part of the part assembly and, in response, displaying a second parameter value from the second sub-child family.

* * * * *